(12) United States Patent
Vassilaros et al.

(10) Patent No.: US 10,507,355 B2
(45) Date of Patent: Dec. 17, 2019

(54) STATIONARY CYCLING PEDAL CRANK HAVING AN ADJUSTABLE LENGTH

(71) Applicant: MindBridge Innovations, LLC, Allentown, PA (US)

(72) Inventors: Daniel L. Vassilaros, Allentown, PA (US); Matthew Sommerfield, Allentown, PA (US)

(73) Assignee: MindBridge Innovations, LLC, Allentown, PA (US)

( * ) Notice: Subject to any disclaimer, the term of this patent is extended or adjusted under 35 U.S.C. 154(b) by 144 days.

(21) Appl. No.: 15/925,262

(22) Filed: Mar. 19, 2018

(65) Prior Publication Data

US 2018/0272184 A1 Sep. 27, 2018

Related U.S. Application Data

(60) Provisional application No. 62/472,870, filed on Mar. 17, 2017.

(51) Int. Cl.
*A63B 22/06* (2006.01)
*B62M 3/02* (2006.01)
*A63B 21/00* (2006.01)
*F16C 3/28* (2006.01)

(52) U.S. Cl.
CPC ...... *A63B 22/0605* (2013.01); *A63B 21/4034* (2015.10); *B62M 3/02* (2013.01); *F16C 3/28* (2013.01); *A63B 2022/0623* (2013.01); *A63B 2225/09* (2013.01)

(58) Field of Classification Search
CPC ............ A63B 22/0605; A63B 21/4034; A63B 2022/0623; A63B 2225/09; F16C 3/28; B62M 3/02
See application file for complete search history.

(56) References Cited

U.S. PATENT DOCUMENTS

| | | | | |
|---|---|---|---|---|
| 3,100,640 A | * | 8/1963 | Weitzel | A63B 22/0007 482/60 |
| 4,915,374 A | * | 4/1990 | Watkins | A63B 22/0605 482/57 |
| 4,973,046 A | * | 11/1990 | Maxwell | A63B 21/00178 482/60 |
| 5,161,430 A | * | 11/1992 | Febey | B62M 3/02 74/594.1 |
| 6,589,139 B1 | * | 7/2003 | Butterworth | B62M 3/02 482/57 |
| 6,802,798 B1 | * | 10/2004 | Zeng | A63B 22/0015 482/57 |

(Continued)

Primary Examiner — Sundhara M Ganesan
(74) Attorney, Agent, or Firm — Design IP

(57) ABSTRACT

An adjustable crank assembly is provided. The adjustable crank assembly includes a crank arm having a surface with a plurality of notches, and a retention block that partially houses the crank arm and allows the crank arm to slide along an axis relative to the retention block. The retention block includes a clamping block and a locking pin, both of which being adapted to selectively engage the crank arm when the retention block is placed in a locked position, and a locking lever for transitioning between a locked position and an unlocked position. The locking lever provides a compressive force to the clamping block when placed in a locked position and a retracting force to the locking pin when placed in an unlocked position.

20 Claims, 16 Drawing Sheets

(56) References Cited

U.S. PATENT DOCUMENTS

| | | | |
|---|---|---|---|
| 2005/0020411 A1* | 1/2005 | Andrews | B62M 3/02 482/63 |
| 2005/0239609 A1* | 10/2005 | Chen | B62M 3/00 482/57 |
| 2006/0019802 A1* | 1/2006 | Caird | A63B 22/0605 482/57 |
| 2009/0211395 A1* | 8/2009 | Mul'e | B62M 3/02 74/594.7 |
| 2009/0239717 A1* | 9/2009 | Kim | A63B 21/027 482/57 |
| 2010/0130331 A1* | 5/2010 | Hu | A63B 22/0046 482/57 |
| 2010/0173747 A1* | 7/2010 | Chen | A63B 22/0002 482/5 |
| 2011/0300997 A1* | 12/2011 | Ilett | A63B 22/0007 482/80 |
| 2012/0065028 A1* | 3/2012 | Gray | A63B 22/0605 482/57 |
| 2014/0206506 A1* | 7/2014 | Huang | A63B 22/0235 482/51 |
| 2014/0243159 A1* | 8/2014 | Oblak | A63B 22/001 482/57 |
| 2015/0174446 A1* | 6/2015 | Chiang | A63B 22/0605 482/8 |
| 2015/0258365 A1* | 9/2015 | Neill | A63B 21/0088 482/54 |
| 2016/0256731 A1* | 9/2016 | Tseng | A63B 21/225 |
| 2017/0113092 A1* | 4/2017 | Johnson | A63B 22/0046 |

* cited by examiner

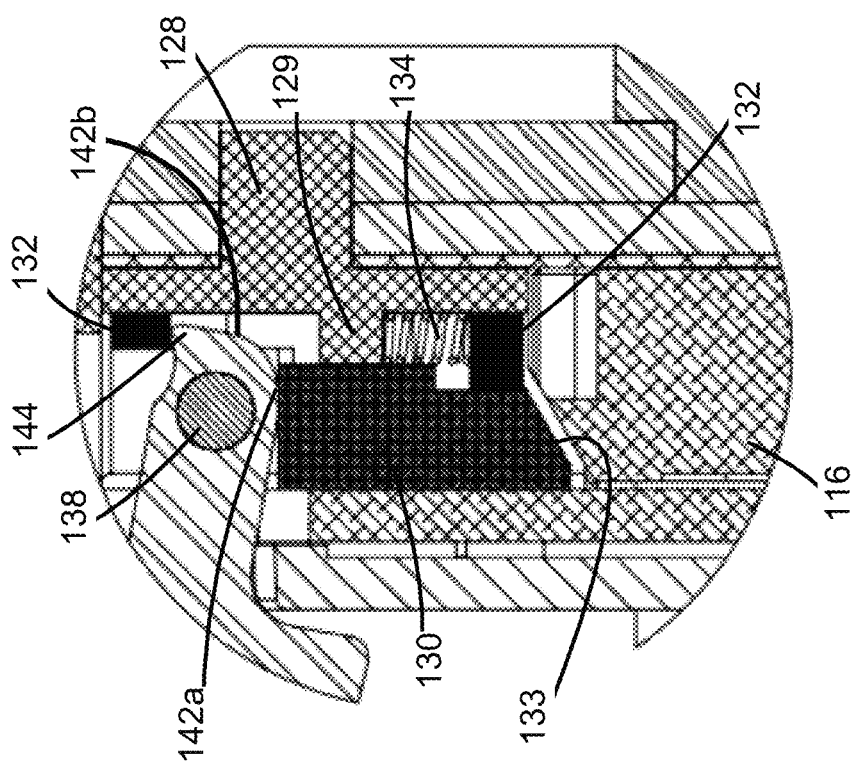
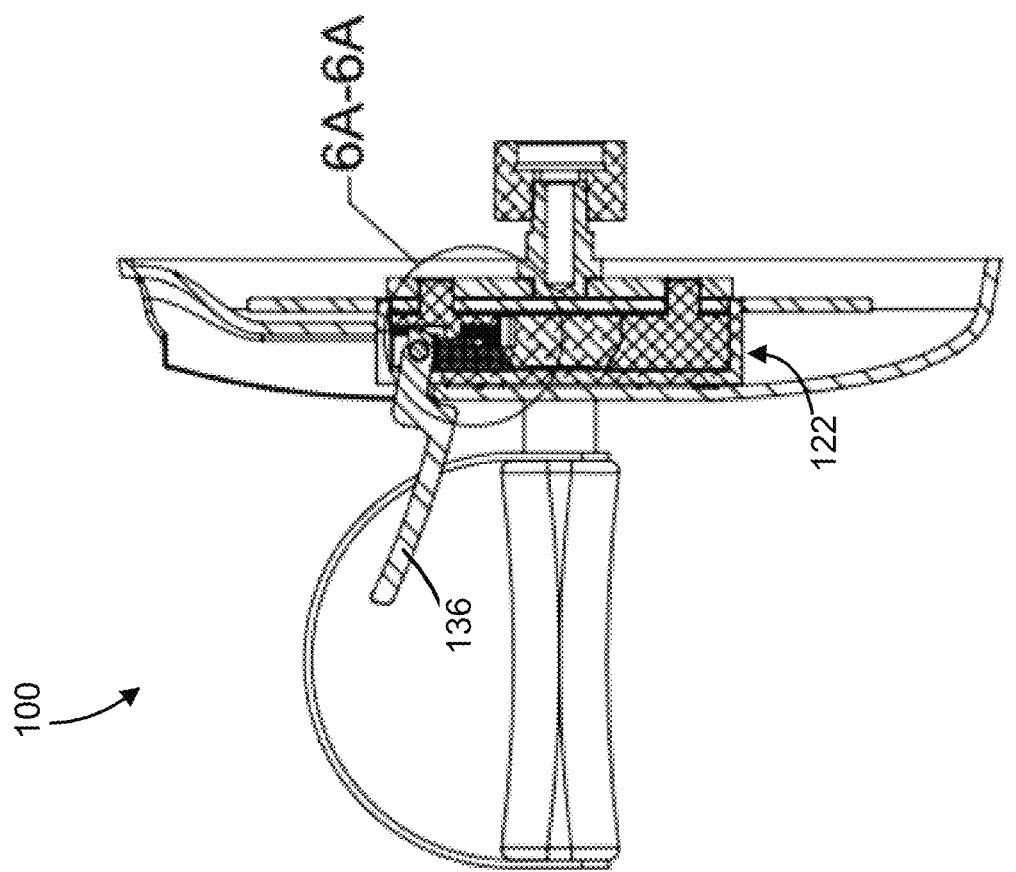

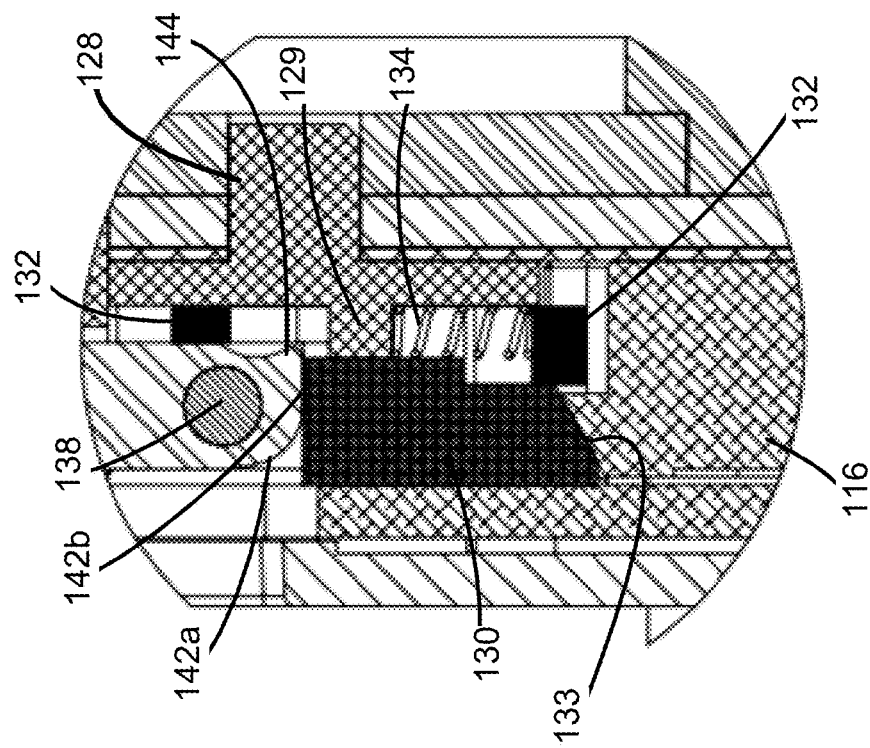
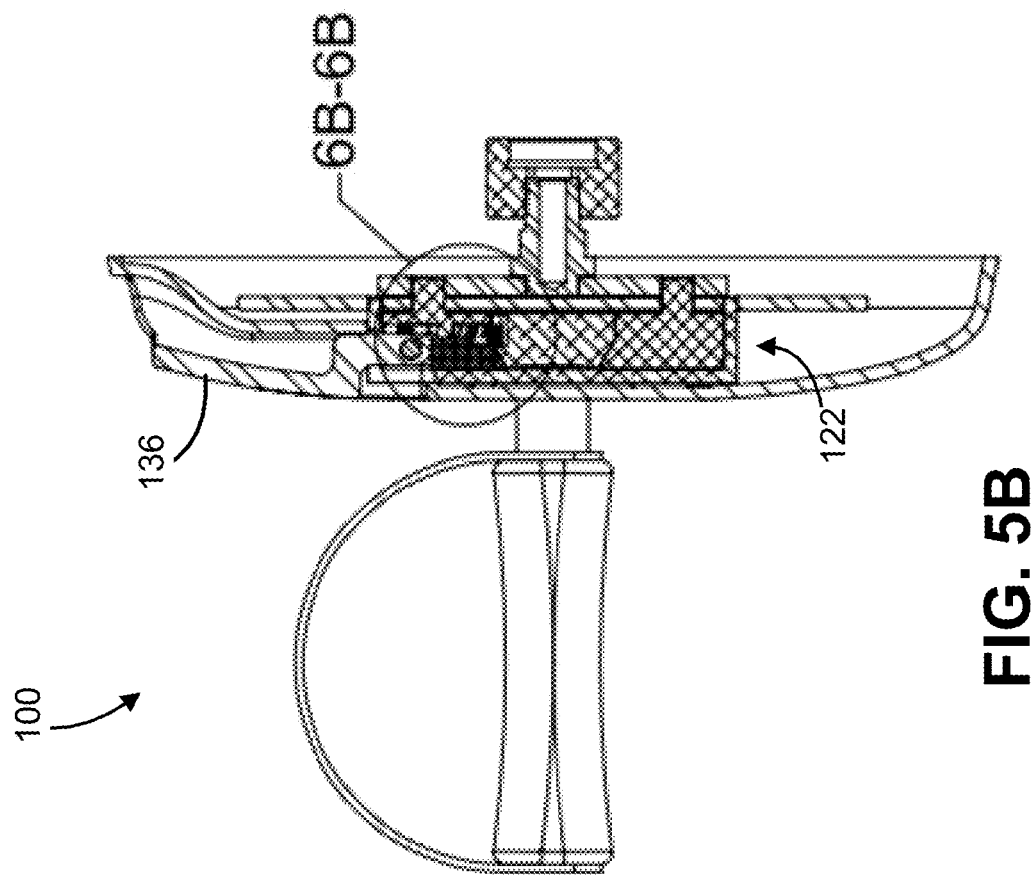
FIG. 6B
FIG. 5B

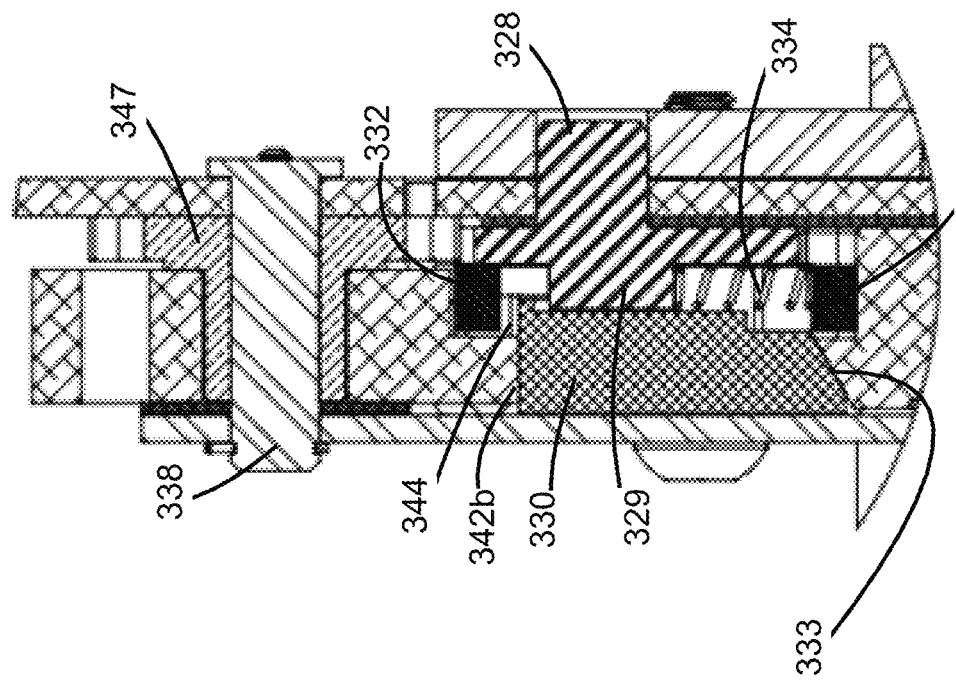
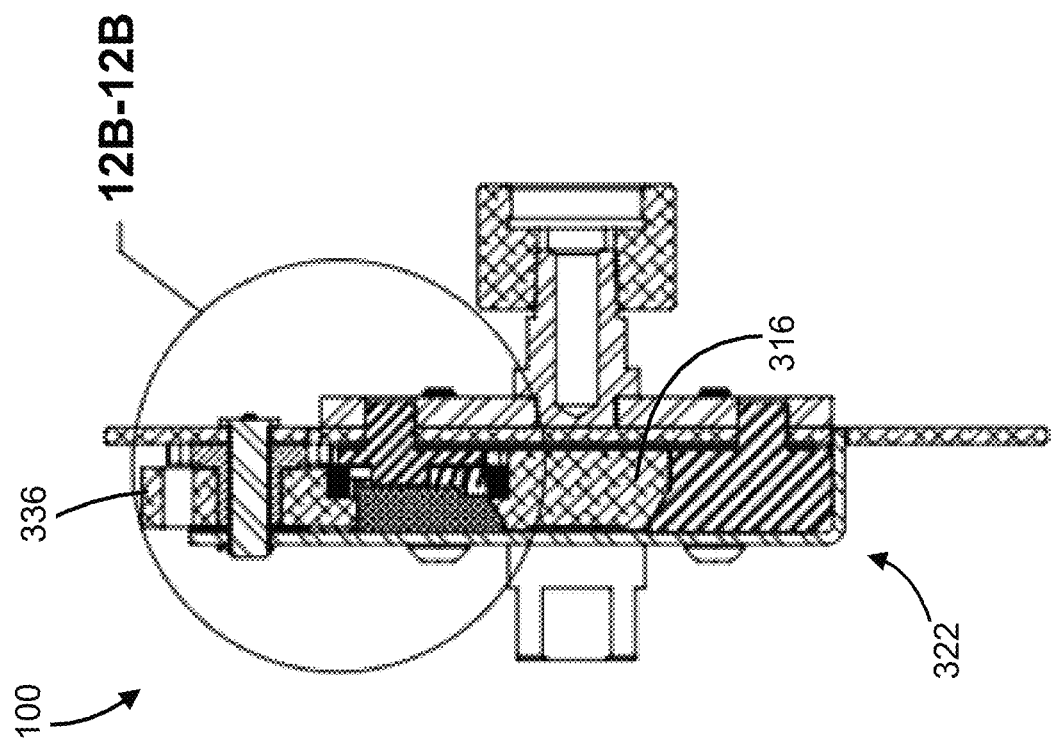

STATIONARY CYCLING PEDAL CRANK HAVING AN ADJUSTABLE LENGTH

BACKGROUND OF THE INVENTION

Lower extremity rehabilitation following joint reconstruction and replacement surgery focuses on increasing flexion, extension, and strength to restore mobility and quality of life. Many protocols describe the standard of care over the full course of rehabilitation. They include well-known manual therapy techniques and exercises. Upright and recumbent stationary exercise bikes from the fitness market are employed for advanced therapy exercise when the patients have achieved range of motion (ROM) sufficient to complete a pedal rotation, usually at a minimum of about 105-110 degrees (knee flexion angle). Patients work on increasing knee flexion to the target of 120 degrees active ROM and increase strength and endurance.

Cycling ergometers equipped with shorter pedal cranks than the commercially available fitness bikes have been shown to be effective in applying cycling exercise earlier in the rehabilitation process. While a set of discrete pedal arms that can be quickly changed out was tested, a single mid-length crank arm was adopted and recommended for clinical use. The extreme position is a pedal crank short enough for a patient to safely use within 24 hours of surgery. If it were fitted to an appropriately designed stationary bicycle, the system could be a replacement for the continuous passive motion (CPM) machine to provide passive, active-assisted, and active movement starting in acute-stage rehabilitation. The minimum length is about 2" which allows about 60 degrees of knee flexion when the knee is in full extension.

The extension of the idea of a set of discrete, interchangeable pedal cranks is a pedal crank system where the distance from the axle to the pedal can be varied quickly, easily, reproducibly, and in coordination with seat adjustments in discrete steps over the therapeutically useful range of about 2" to 6". Variable-length pedal arm systems have been described only several times in the medical literature and offered commercially in several products. However, all such products are either lacking essential features that preclude their broad application or are inherently flawed. For example, the SciFit adjustable pedal and arm cranks vary only between 5" and 7", a range that is only marginally therapeutically useful because by the time a patient can complete rotations at 90-95 degrees knee flexion, progress is rapid and the adjustable cranks are not important. Further, neither the patients nor the therapists understand the quantitative relationship between pedal crank length and knee flexion angle, the OEM does not make such information available, and the crank positions are not marked.

Design options include fixing the pedal to the arm and moving the assembly or fixing the crank arm and moving the pedal along it. Further, standard design for locating the pedal or crank and securing it is based upon a retractable pin (captive or free) that is operated by the hand by fully withdrawing the pin from the holes in the pedal and crank arm (free) or by the hand or a digit such as the thumb actuating the captured pin by compressing the spring as the pin is withdrawn from its seat in a hole in the crank (captive). Withdrawing the pin allows the pedal to slide transversely along the fixed crank or the pedal crank arm to slide transversely through the crank arm's locking mechanism until a suitable length is found, at which point the pin is reinserted into the locking mechanism.

A massive system such as the SciFit locks the crank arm securely in place with two large diameter pins but cannot be sized to permit a 2-inch long crank. Smaller systems that may reach 2 inches in length use a single pin but the single pin and necessary machining tolerances cannot eliminate excess play, and subsequent vibration and small but perceptible regular movement as the force on the pedal varies during the pedal rotation. Depending on the design, the moving component can also bind as it slides along the fixed component during adjustment. The vibration and clicking annoy the patient and therapist but more importantly dramatically increases the wear of the sliding surfaces leading to premature component failure. A variable-length pedal crank assembly for use on a cycling ergometer in the orthopedic rehabilitation clinic or home must be rugged, quick and easy to adjust, simple and labeled. The crank or pedal must be fixed securely in place with no vibration at all adjustment points and simultaneously physically engaged to prevent the foot from loosening it under any circumstances and removing it from the system.

SUMMARY OF THE INVENTION

In view of the foregoing background, an adjustable pedal crank assembly is provided. The crank assembly includes a crank arm having a surface with a plurality of notches, a pedal rotatably attached to the distal end of the crank arm, and a retention block that partially houses the proximal end of the crank arm. The retention block is sized and shaped to enable the crank arm to move along an axis of the crank arm relative to the retention block.

The retention block includes a securing mechanism that comprises a locking pin and a clamping body. The locking pin is sized and shaped to selectively engage each of the plurality of notches and includes a resilient member, such as a spring, that biases the locking pin toward the surface of the crank arm. The clamping body is sized and shaped to interface with the surface of the crank arm and is configured to selectively apply a clamping force to the surface of the crank arm. In one embodiment, the clamping body has a wedge shape.

The retention block further includes a locking mechanism that is sized and shaped to interact with the locking pin and the clamping body. The locking mechanism is configured to operate in an unlocked (i.e., open) position, a locked (i.e., closed) position, and a neutral position that is intermediate between the unlocked and locked positions. When the locking mechanism is placed in the unlocked position, the locking mechanism applies an upward, retracting force to the locking pin that lifts the locking pin away from the surface of the crank arm. When the locking mechanism is placed in the locked position, the locking mechanism applies a downward, compressive force to the clamping body that translates to the clamping body, applying a clamping force to the surface of the crank arm.

In one embodiment, the locking mechanism comprises a locking lever that rotates about a pin when moving between the unlocked position and the locked position. The locking lever includes a cam surface that abuts the clamping body and provides the downward compressive force to the clamping block when in the locked position. The locking lever also includes a lever pawl that provides the upward retracting force to the locking pin when in the unlocked position.

The clamping body is vertically slidable relative to the retention block and acts as a cam follower that returns radially with respect to the cam center when the locking lever is placed in its neutral and open positions, and the clamping block is driven radially down by the maximum radius of the cam profile when the locking lever is placed in its closed position. The clamping block is pressed downward against the angled surface of the upper side of the crank arm by the cam to inhibit lateral and rotational movement of the crank arm relative to the retention block when the locking lever is placed in said closed position.

The lever pawl engages the locking pin to lift the locking pin away from the crank arm when the locking lever is placed in the open position, and the lever pawl disengages from the locking pin when the locking lever is placed in its neutral position and closed position, thereby allowing the locking pin to interface with one of the plurality of notches of the crank arm. In one embodiment, the locking pin includes a locking spring that compresses when the locking lever is placed in the open position, now tensioned, and expands when the locking lever is placed in its neutral and closed positions.

BRIEF DESCRIPTION OF THE DRAWINGS

The present invention will hereinafter be described in conjunction with the appended drawing figures wherein like numerals denote like elements.

FIG. 5A is the view of FIG. 5 showing the locking lever in the open position;

FIG. 6A is an enlarged partial view of area 6A-6A of FIG. 5A;

FIG. 5B is the view of FIG. 5 showing the locking lever in a closed position;

FIG. 6B is an enlarged partial view of area 6B-6B of FIG. 5B;

FIG. 11B is the view of FIG. 11 showing the locking lever in a closed position;

FIG. 12B is an enlarged partial view of area 12B-12B of FIG. 11B;

DETAILED DESCRIPTION OF THE PREFERRED EMBODIMENTS

Figure 1:
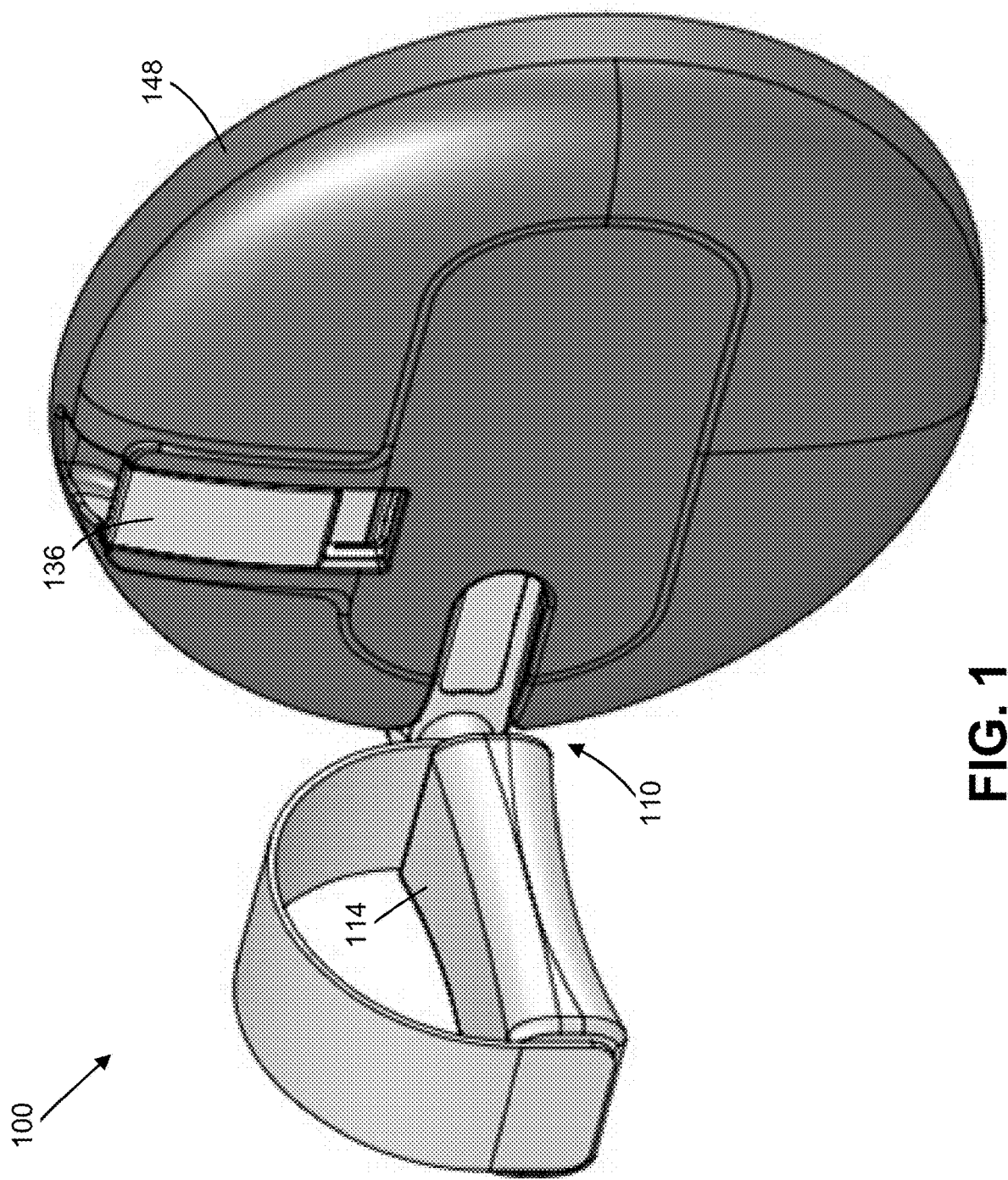
FIG. 1 is a perspective view of a pedal crank assembly constructed in accordance with an embodiment of the present invention.

The ensuing detailed description provides preferred exemplary embodiments only, and is not intended to limit the scope, applicability, or configuration of the invention. Rather, the ensuing detailed description of the preferred exemplary embodiments will provide those skilled in the art with an enabling description for implementing the preferred exemplary embodiments of the invention. It is understood that various changes may be made in the function and arrangement of elements without departing from the spirit and scope of the invention, as set forth in the appended claims.

To aid in describing the invention, directional terms are used in the specification and claims to describe portions of the present invention (e.g., upper, lower, left, right, etc.). These directional definitions are merely intended to assist in describing and claiming the invention and are not intended to limit the invention in any way. In addition, reference numerals that are introduced in the specification in association with a drawing figure may be repeated in one or more subsequent figures without additional description in the specification in order to provide context for other features.

Figure 2:
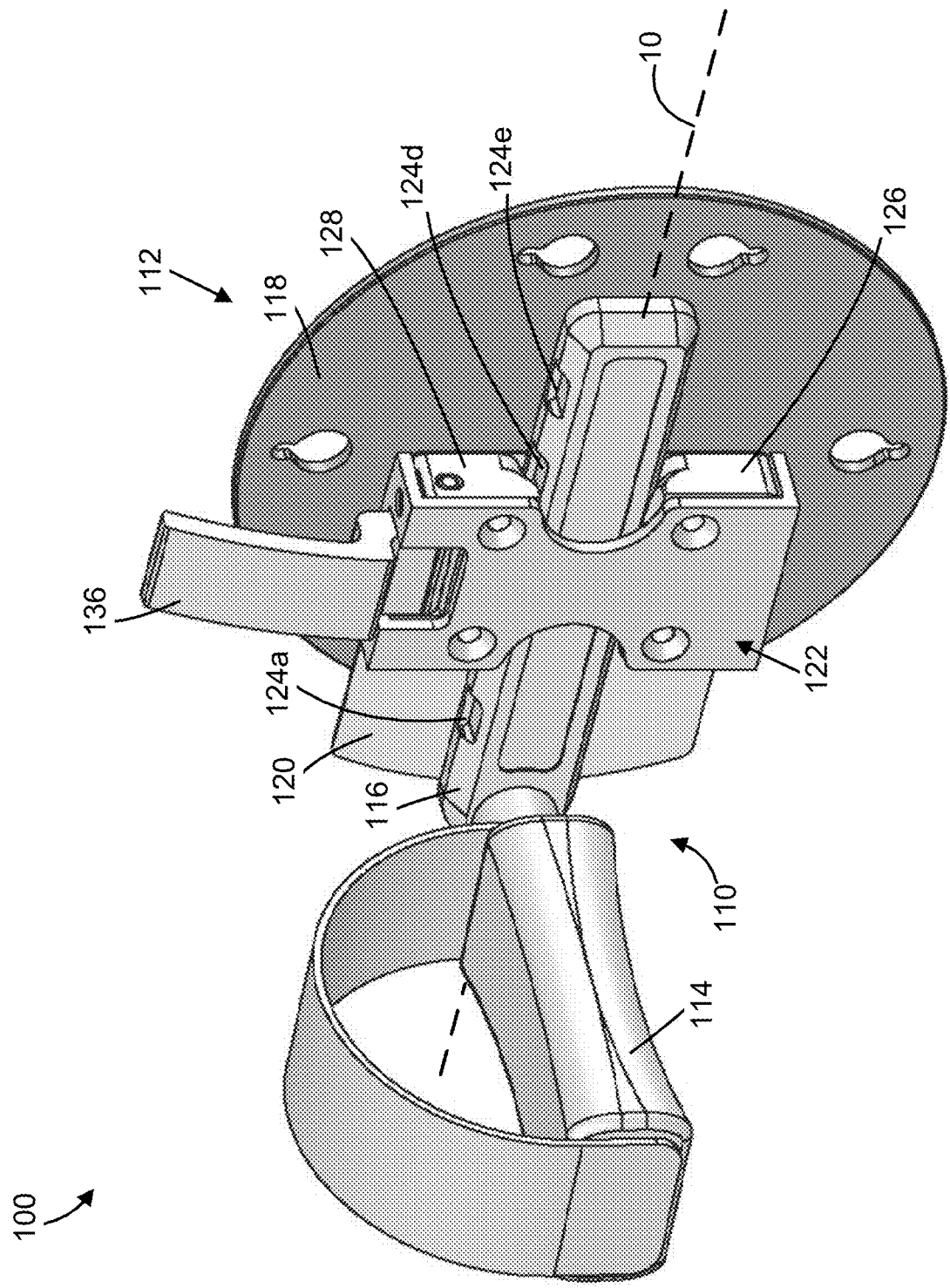
FIG. 2 is a perspective view of the pedal crank assembly shown in FIG. 1 with the cover of the mounting assembly removed.

Referring to FIGS. 1-2, a rotating variable-length pedal crank assembly 100 having a pedal crank sub-assembly 110 attached to a mounting assembly 112 is shown. The pedal crank sub-assembly 110 includes a pedal 114 that is attached to a crank arm 116, with the crank arm 116 having an axis 10 and being slidably engaged with the mounting assembly 112, and the pedal 114 being configured to freely rotate relative to the crank arm 116. The mounting assembly 112 includes a mounting plate 118 with a smaller glide plate 120 on the face of one side of the mounting plate 118, and a retention block 122 disposed on the face of the glide plate 120 through which the crank arm 116 is inserted. The crank arm 116 of the pedal crank sub-assembly 110 includes a plurality of notches 124a-e on the upper side of the crank arm 116, the plurality of notches 124a-e being sized and shaped to interact with the retention block 122 in the manner discussed further below.

The retention block 122 is sized and shaped to house one end of the crank arm 116 and is configured to operate in a locked state, where movement between the crank arm 116 and the retention block 122 is arrested, and an unlocked state, where the crank arm 116 is enabled to slide through the retention block in two directions along the axis 10. Within the retention block 122 is a clamping body and a locking pin (not shown; see FIG. 3) that are configured to selectively engage the crank arm depending on whether the retention block 122 is in an unlocked or locked state, as further explained below.

Figure 3:
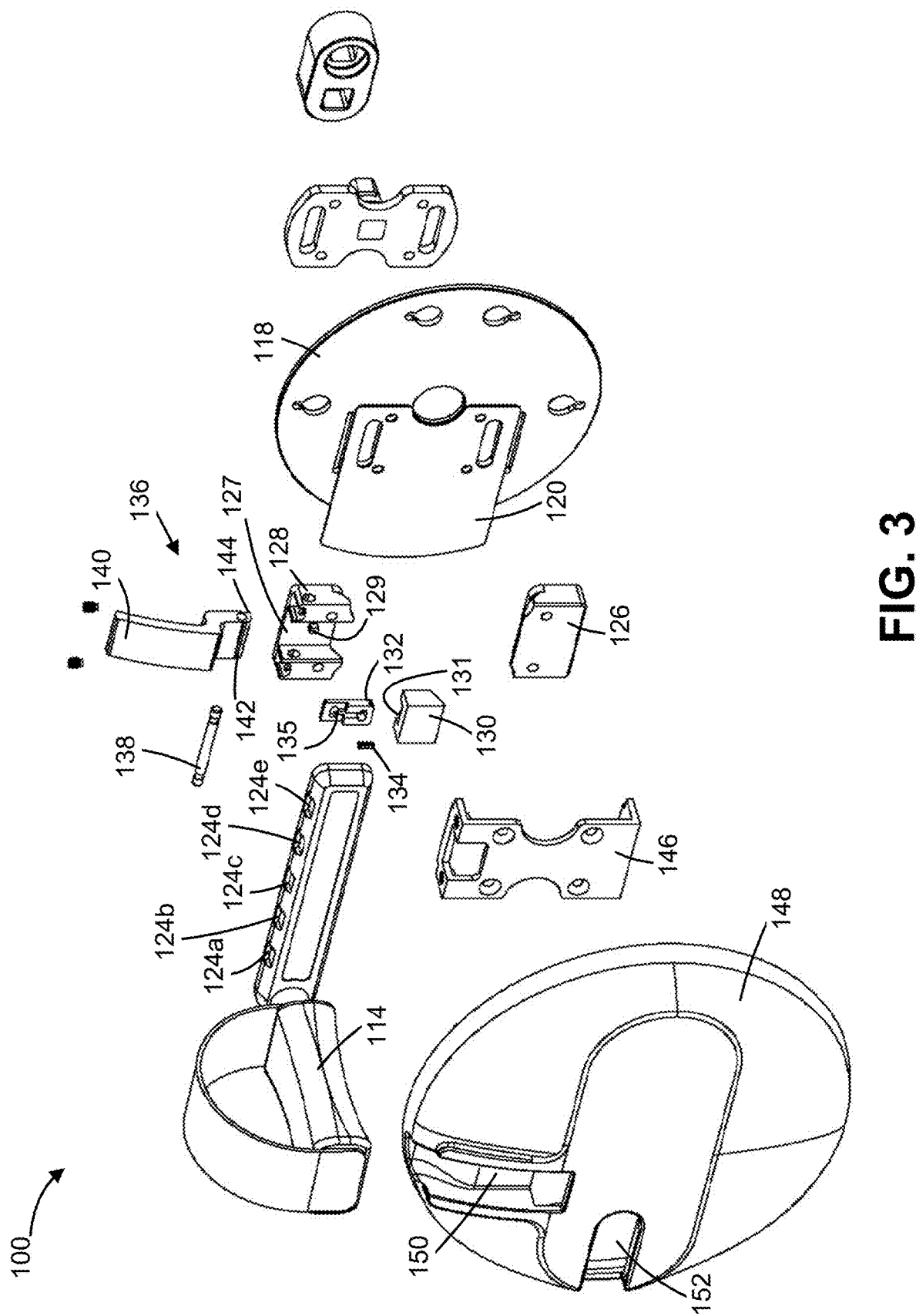
FIG. 3 is an exploded view of the pedal crank assembly shown in FIG. 1.

Referring now to FIG. 3, the retention block 122 includes a fixed lower glide block 126 and a fixed upper glide block 128 that are attached to the glide plate 120 on opposite sides thereof. The fixed lower glide block 126 and fixed upper glide block 128 are sized and shaped to interface with the plurality of surfaces of the lower and upper sides of the crank arm 116.

The fixed upper glide block 128 includes a channel 127 which accommodates a clamping block 130 (i.e., the clamping body), and the clamping block 130 includes a channel 131 which accommodates a locking pin 132. The channel 127 of the fixed upper glide block 128 is sized and shaped to allow the clamping block 130 to slide vertically through the channel 127 while not allowing the clamping block 130 to move laterally within the channel 127 of the fixed upper glide block 128. Likewise, the channel 131 of the clamping block 130 is sized and shaped to allow the locking pin 132 to slide through the channel 131 while not allowing the locking pin 132 to move laterally within the channel 131 of the clamping block 130.

The clamping block 130 is sized and shaped to selectively interface with the angled surface of the upper side of the crank arm 116 when the retention block 122 is in the locked state. More particularly, the clamping block 130 has a clamping surface 133 that is angled from the vertical path of the clamping block 130 provided by the channel 127 of the fixed upper glide block 128. In such circumstances, when a downward force is applied to the clamping block 130, the clamping block surface 133 applies a clamping force to the angled surface of the upper side of the crank arm 116 that is orthogonal to the clamping block surface 131 and oblique to the vertical path of the clamping block 130. In such circumstances, a component of the clamping force applies a lateral force against the crank arm 116 that presses the crank arm 116 against the glide plate 120, and a component of the clamping force applies a downward force against the crank arm 116 that presses the crank arm 116 against the lower glide plate 126. The clamping block 130 is made from a polymeric substance and is compressively resilient to conform to the angled surface of the crank arm 116 when the clamping block 130 is pressed against the crank arm 116. In one embodiment, the clamping block 130 has a wedge shape for pushing the back (first) side of the crank arm 116 against the glide plate 120 and against the fixed lower glide block 126 to inhibit movement of the crank arm 116 along any axis.

The locking pin 132 is sized and shaped to interface with one of the plurality of notches 124a-e when the clamping block 130 of the retention block 122 engages with the crank arm 116. The locking pin 132 has a recess on its upper portion and includes a cavity 135 that houses a resilient locking spring 134 that biases the locking pin 132 toward the upper side of the crank arm 116. The cavity 135 of the locking pin 132 extends the approximate length of the locking pin 132, and the length of the locking spring 134 extends from the lower end of the cavity 135 of the locking pin 132 to a tab 129 in the fixed upper glide block 128.

The retention block 122 further includes a locking lever 136 that is rotatably attached to the fixed upper glide block 128 via a pin 138 that is substantially parallel to the axis 10 of the crank arm 116. The locking lever 136 includes a lever arm 140, a cam 142 that abuts the clamping block 130, and a lever pawl 144 that is sized and shaped to hook into the cavity 135 of the locking pin 132 when the locking lever 136 is placed into an open position. The cam 142 has a minimum radius profile 142a and a maximum radius profile 142b, which are identified in FIG. 6 and whose function in operating the locking lever 136 is discussed further below. The retention block 122 also includes a support cap 146 for keeping the various parts of the retention block 122 together while maintaining their integrity.

In this application, the term "substantially parallel" refers to an orientation that is 0°±5° from the reference axis. In other words, if the pin 138 is substantially parallel to the axis 10, the orientation of the pin 138 is between −5° and 5° from the axis 10. Preferably, the term "substantially parallel" refers to an orientation that is 0°±1° (i.e., between −1° and 1°) from the reference axis.

Figure 4:
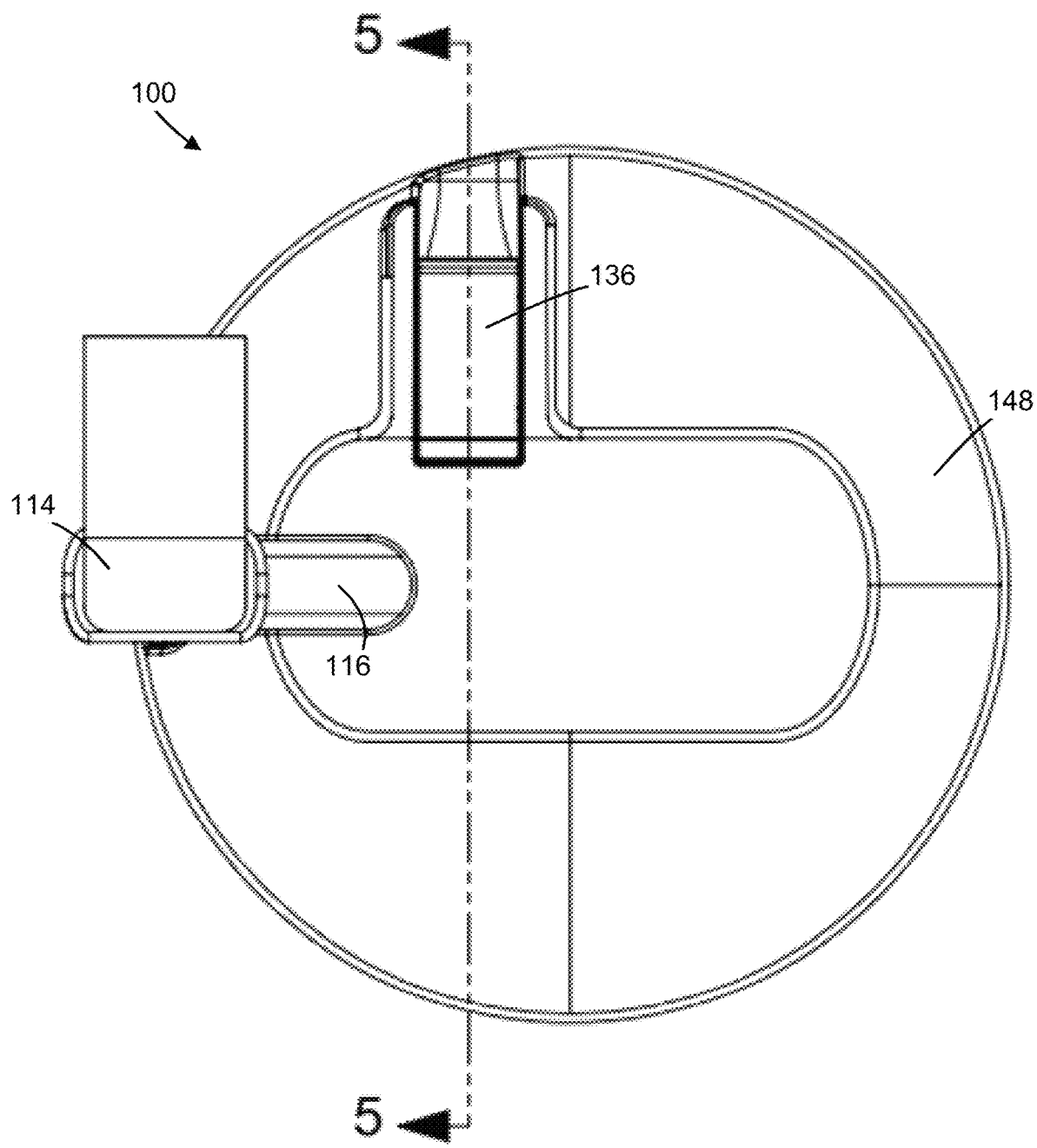
FIG. 4 is a front elevational view of the pedal crank assembly shown in FIG. 1.

Referring to FIGS. 1, 3 and 4, the mounting assembly 112 is covered by a cover plate 148 to protect the mounting assembly 112 from damage and to prevent the user from contacting any part of the mounting assembly 112 during use. The cover plate 148 is sized and shaped to fit over the mounting assembly 112 and includes a lever slot 150 through which the locking lever 136 is inserted, allowing the locking lever 136 to be manipulated while the cover plate 148 is covering the remaining parts of the mounting assembly 112. The cover plate 148 also includes a pedal slot 152 to accommodate the pedal 114 when the pedal crank subassembly 110 is moved from one position to another relative to the retention block 122.

Figure 6:
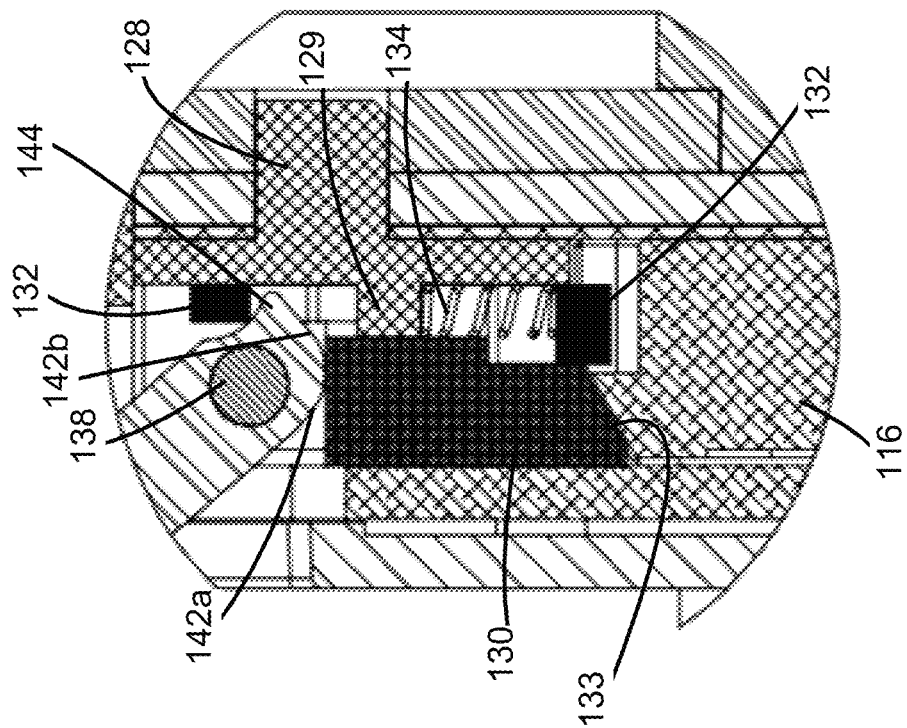
FIG. 6 is an enlarged partial view of area 6-6 of FIG. 5.
Figure 5:
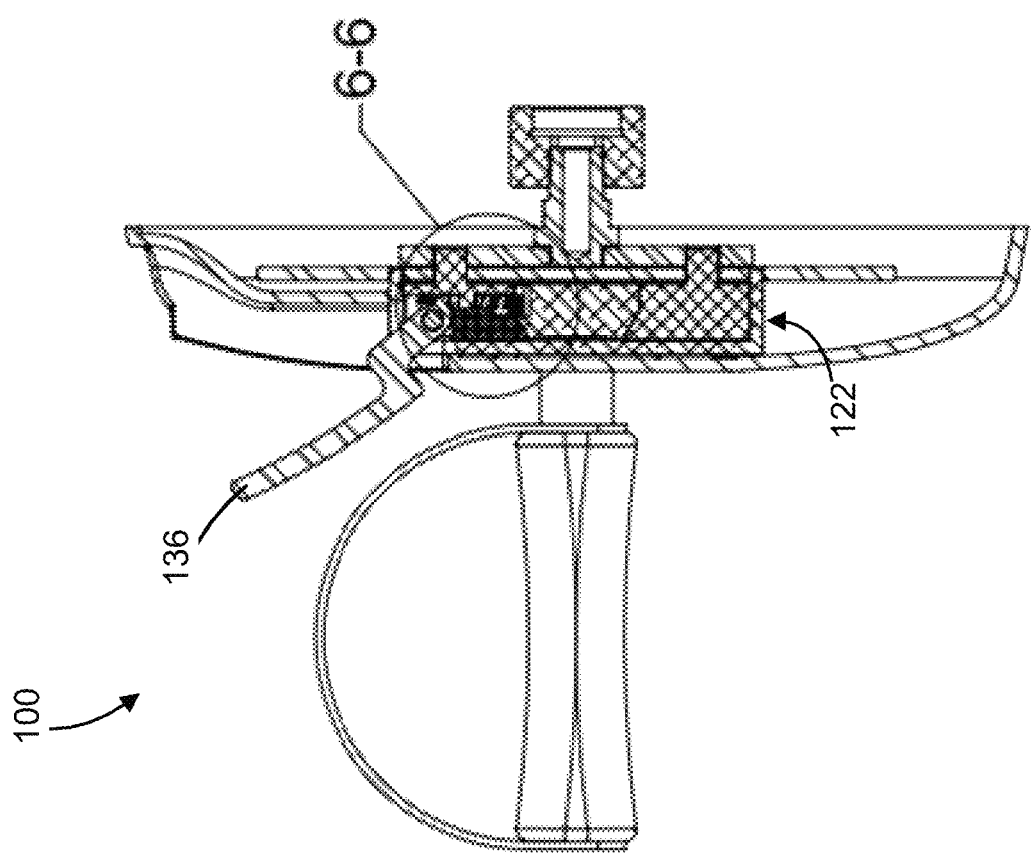
FIG. 5 is a cross-sectional view of the pedal crank assembly shown in FIG. 4 taken along the line 5-5 and looking in the direction of the arrow, the locking lever being shown in a neutral position.

Turning now to FIGS. 4-6, the operation of the clamping block 130 and locking lever 136 will be discussed. The locking lever 136 has three positions: an open position, which corresponds to the unlocked state of the retention block 122 (see FIGS. 5A and 6A); a closed position, which corresponds to the locked state of the retention block 122 (see FIGS. 5B and 6B); and a neutral position, which is the intermediate position between the open and closed positions (see FIGS. 5 and 6). To place the locking lever 136 in the neutral position, the lever arm 140 is pulled away from the mounting assembly 112 and rotated downwardly about the pin 138 until it reaches its neutral position, as shown in FIGS. 5 and 6. When the locking lever 136 is in its open and neutral position, the cam 142 has been rotated so that its minimum radius profile 142a abuts the clamping block 130, releasing the perpendicular and stabilizing force exerted by the clamping block 130 against the angled surface of the upper side of the crank arm 116.

With reference to FIGS. 5A and 6A, pushing the locking lever 136 further downwardly to its open position engages the lever pawl 144 with the locking pin 132, applying a retracting force to lift the locking pin 132 upward and away from the crank arm 116 and compressing the locking spring 134 between the locking pin 132 and the tab 129 of the fixed upper glide block 128, thereby creating a load in the locking spring 134. In such circumstances, the locking lever 136 is tensioned and the crank arm 116 may slide freely along its axis 10 through the retention block 122. The locking lever's 136 tensioned, open position is required to move the crank arm 116.

Releasing the locking lever 136 to its neutral position (FIG. 5) retracts the lever pawl 144 from locking pin 132, allowing the locking spring 134 to exert force against the locking pin 132 and the tab 129 to push the locking pin 132 downward. The locking pin 132 will either be forcibly inserted into one of the notches 124a-e or will contact the angled surface of the upper side of the crank arm 116 until crank arm 116 is moved to a position where one of the notches 124a-e is aligned with locking pin 132. When locking lever 136 is in its open position, the crank arm 116 can be moved transversely through the retention block 122 (past the fixed lower and upper glide blocks 126, 128) to adjust the crank distance. In the neutral position of locking lever 136, the locking pin 132, under pressure from locking spring 134 as it slides along the upper surface of crank arm 116, will be forcibly inserted into the next available one of the notches 124a-e, audibly and tactilely informing the user that the locking pin has indeed been located properly and securely in a notch, to assist with visually relocating the crank arm 116 to a precise location. Thus, when the locking lever 136 is in the neutral position and closed position, the locking pin 132, when inserted into one of the plurality of notches 124a-e, prevents the crank arm 116 from moving lengthwise relative to the retention block 122 with a positive lock. Clamping block 130 will exert clamping pressure to the angled surface of the upper side of the crank arm 116; however, locking pin 132 provides positive location and a stronger resistance to sliding than the clamping force that clamping block 130 can provide on its own.

Referring to FIGS. 5B and 6B, when the locking lever 136 rotates from the neutral position to a closed position, the cam 142 rotates about the pin 138 until its maximum radius profile 142b applies a compressive force to the clamping block 130, pushing the clamping block 130 toward the angled surface of the upper side of the crank arm 116. When the locking lever 136 finishes rotating into its closed position, the cam 142 profile at its maximum radius profile 142b is flat against the clamping block 130, ensuring that the clamping block 130 continues to apply a perpendicular force against the crank arm 116 and that the crank arm 116 will remain immobile while the locking lever 136 is in a closed position. The clamping block 130 stabilizes the crank arm 116 within the retention block 122 and inhibits shifting or vibration of the crank arm 116. The dimension of the maximum radius profile 142b of the cam 142 and the position of the pin 138 with respect to the crank arm 116 determine the extent of compression of clamping block 130.

FIG. 7 and FIGS. 8-12 illustrate second and third embodiments, respectively, of the present invention. The elements illustrated in FIG. 7 which correspond, either identically or substantially, to the elements described above with respect to the embodiment shown in FIG. 2 have been designated by corresponding reference numbers increased by one hundred. Any element referenced below and identified in the attached drawings should be assumed as having the same or similar structure and function as its corresponding element shown in previous figures, except where specifically indicated otherwise below.

Figure 7:
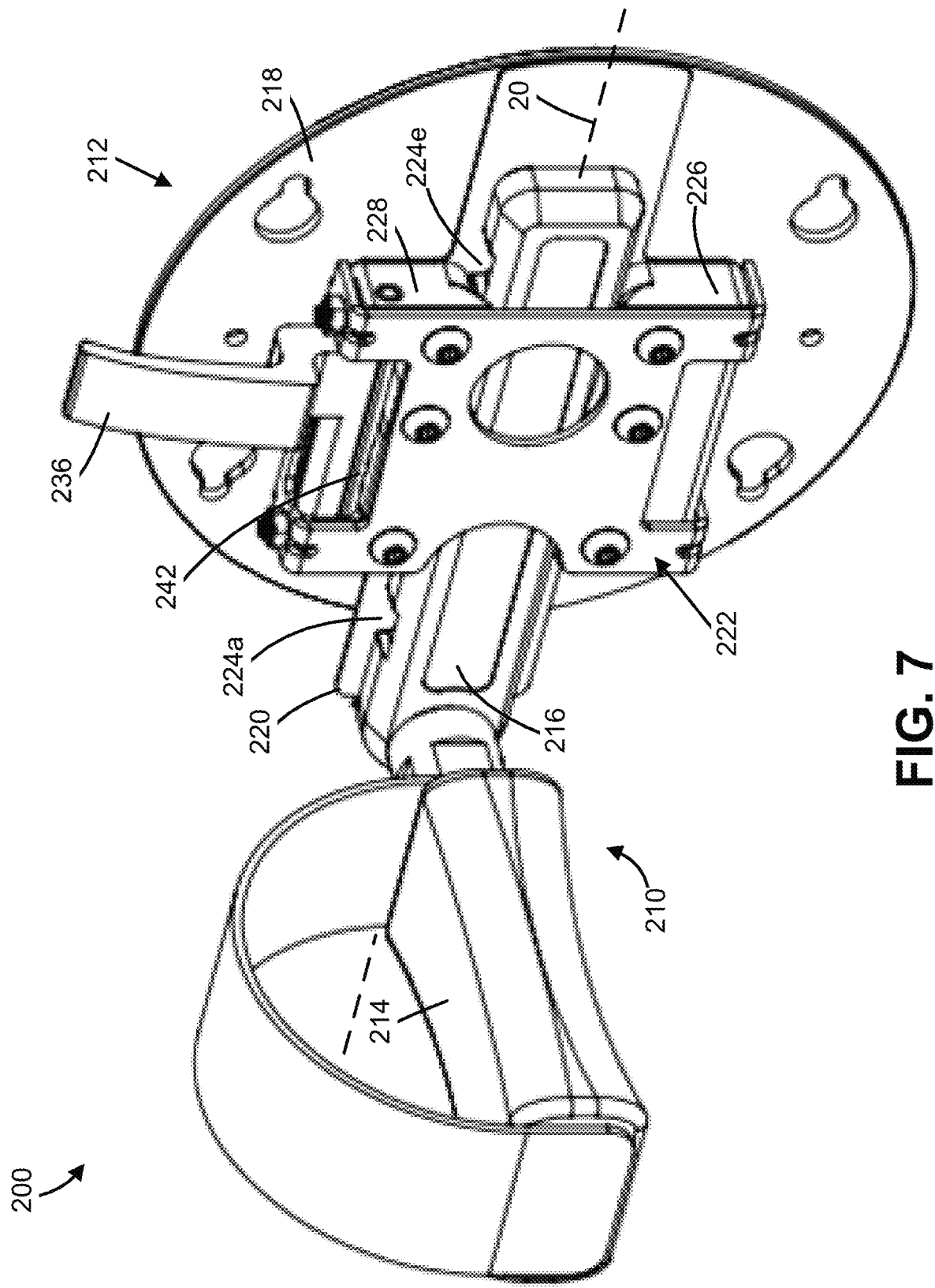
FIG. 7 is a perspective view of a pedal crank assembly in accordance with a second embodiment of the present invention.

With reference to FIG. 7, a crank assembly 200 is illustrated as being similar to the crank assembly 100 shown in FIG. 2, with the exceptions of the size of the retention block 222 relative to the crank arm 216 and the shape of locking lever 236. The retention block 222 has a larger width that increases the contact area between fixed upper and lower guide blocks 226 and 228 and the comparable surfaces of crank arm 216. The locking lever 236 has a wider cam surface 242 that enables the locking lever 236 to apply distributed pressure to a wider clamping block (not shown) for improved stability when in a closed position, but maintains a lever arm 240 that is the same size as the lever arm 140 of the crank assembly 100 shown in FIG. 1. In addition, the position of lever arm 240 is laterally offset from the center of the retention block 222 to permit use of varying pedal geometries and applications.

Figure 8:
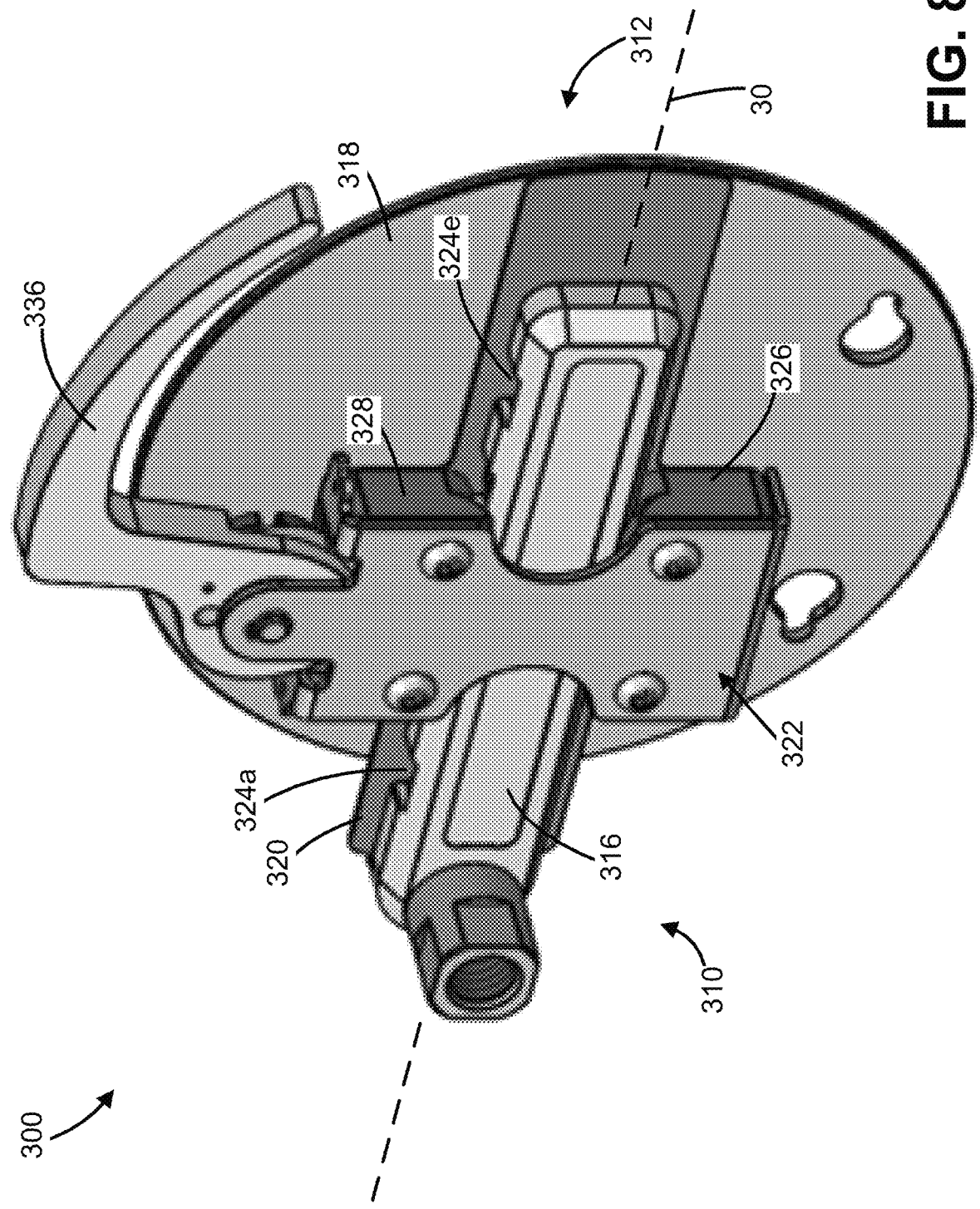
FIG. 8 is a perspective view of a pedal crank assembly in accordance with a third embodiment of the present invention.
Figure 9:
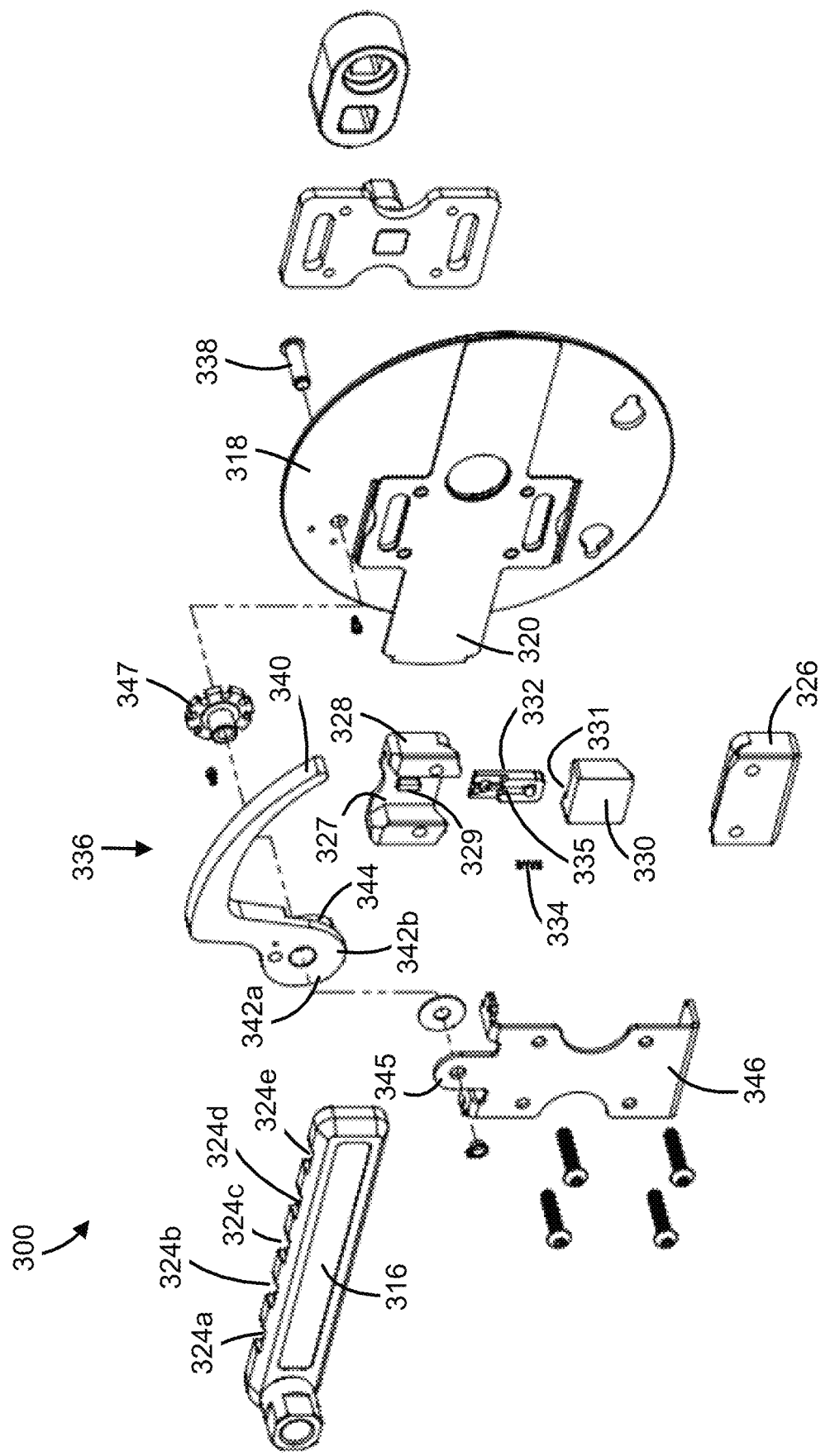
FIG. 9 is an exploded view of the pedal crank assembly shown in FIG. 8.

Referring to FIGS. 8 and 9, a third embodiment of a crank assembly 300 utilizes a locking lever 336 that rotates about a pin 338 that is substantially perpendicular to the axis 30 of the crank arm 316. As with the orientation shown in FIG. 7, this orientation creates additional clearance between the crank arm 316 and the locking lever 336 by removing the presence of the locking lever 336 entirely from the path of a pedal attached to the end of the crank arm 316, regardless of whether the locking lever 336 is in an open, neutral, or locked position. As a result, many of the features of the locking lever 336 are turned 90° relative to the positioning of their counterparts in the locking lever 136 of the crank assembly 100. To accommodate this positioning, the pin 338 that serves as the axle for the locking lever 336 is held in place by an aperture in the mounting plate 318 and a pinhole tab 345 extending from the upper edge of the support cap 346 of the retention block 322.

Instead of being located in the same rotational plane, the cam 342 and the lever pawl 344 of the locking lever 336 are located adjacent to each other in parallel rotational planes, as seen in FIG. 9. This allows the clamping block 330 and the locking pin 332 to have the same orientation as that of their counterparts in the crank assembly 100 shown in FIGS. 1-6. The locking lever 336 also includes a bushing 347 that provides a buffer between the pin 338 and the locking lever 336, as well as between the locking lever 336 and the mounting plate 318.

In this application, the term "substantially perpendicular" refers to an orientation that is 90°±5° from the reference axis. In other words, if the pin 338 is substantially perpendicular to the axis 30, the orientation of the pin 338 is between 85° and 95° from the axis 30. Preferably, the term "substantially perpendicular" refers to an orientation that is 90°±1° (i.e., between 89° and 91°) from the reference axis.

Figure 10:
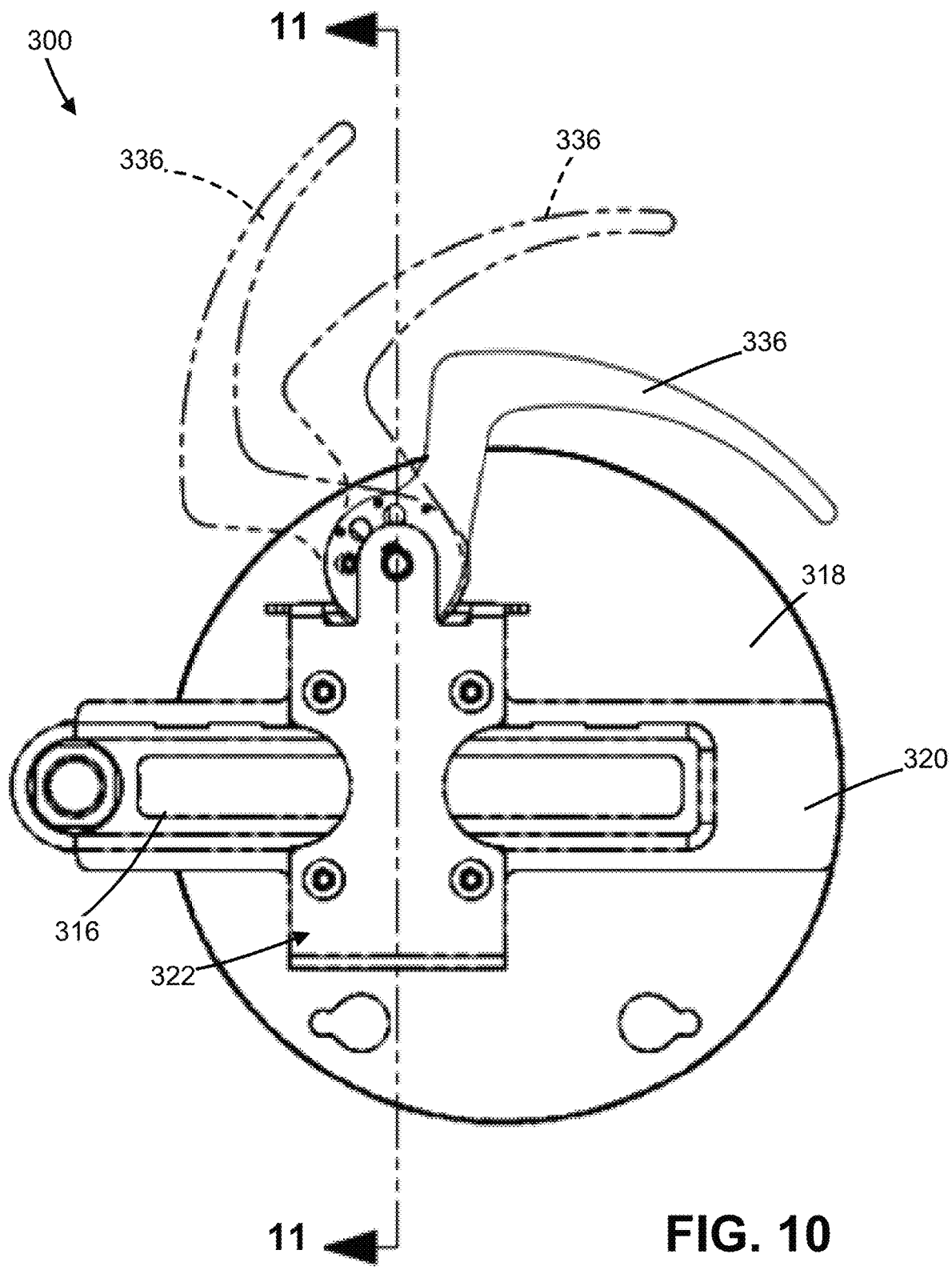
FIG. 10 is a front elevational view of the pedal crank assembly shown in FIG. 8 with the locking lever being shown in a closed position in solid lines and in a neutral position and an open position in broken lines.

FIG. 10 illustrates the lever action of the locking lever 336 of the crank assembly 300. As with the previously discussed embodiments, the locking lever 336 has three positions that correspond to the three states of the retention block 322: a closed position (i.e., the right-most position of the locking lever 336 shown in FIG. 10); a neutral position (i.e., the middle position of the locking lever 336 in FIG. 10); and an open position (i.e., the left-most position of the locking lever 336 in FIG. 10).

Figure 12:
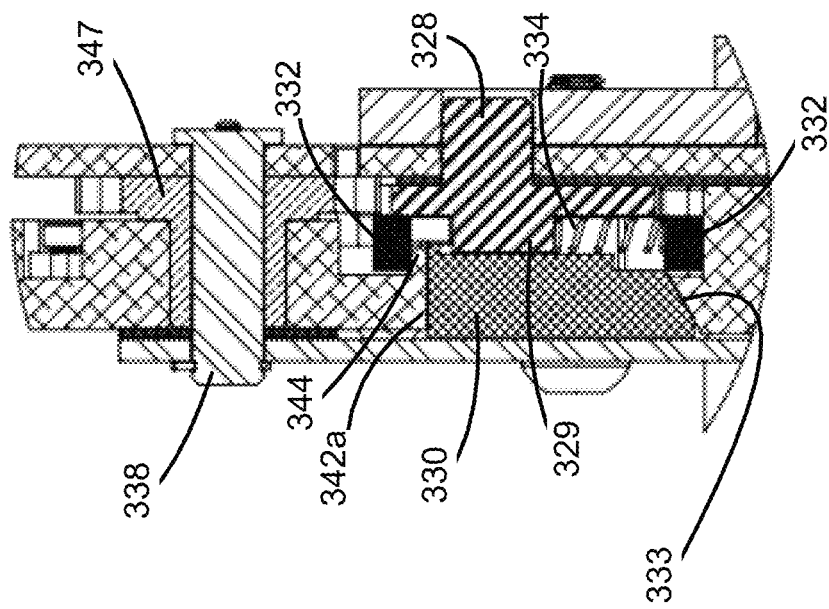
FIG. 12 is an enlarged partial view of area 12-12 of FIG. 11.
Figure 11:
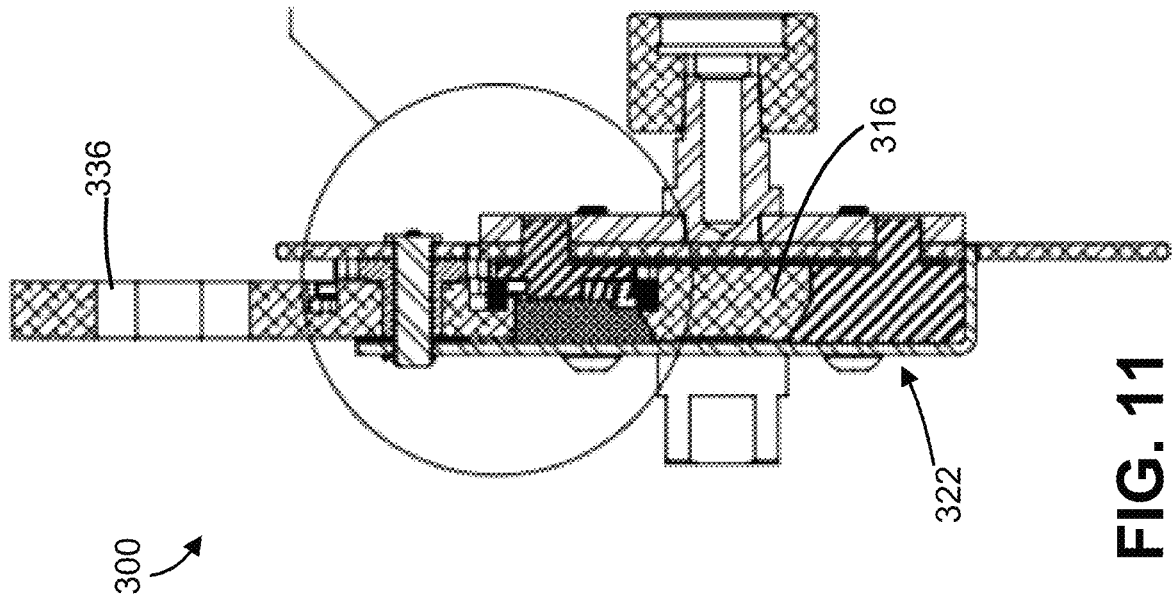
FIG. 11 is a cross-sectional view of the pedal crank assembly shown in FIG. 10 taken along the line 11-11 and looking in the direction of the arrow, the locking lever being shown in a neutral position.

With reference to FIGS. 11 and 12, when the locking lever 336 is in a neutral position, the cam 342 has been rotated so that its minimum radius profile 342a of the cam 342 abuts the clamping block 330, ensuring that the cam 342 exerts no downward force on the clamping block 330. In addition, the lever pawl 344 is engaged with, but has not lifted, the locking pin 332.

Figure 12A:
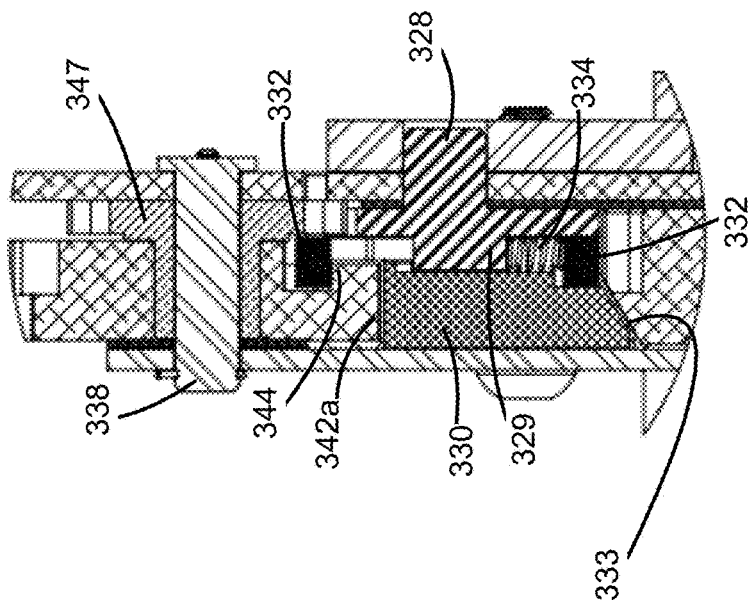
FIG. 12A is an enlarged partial view of area 12A-12A of FIG. 11A.
Figure 11A:
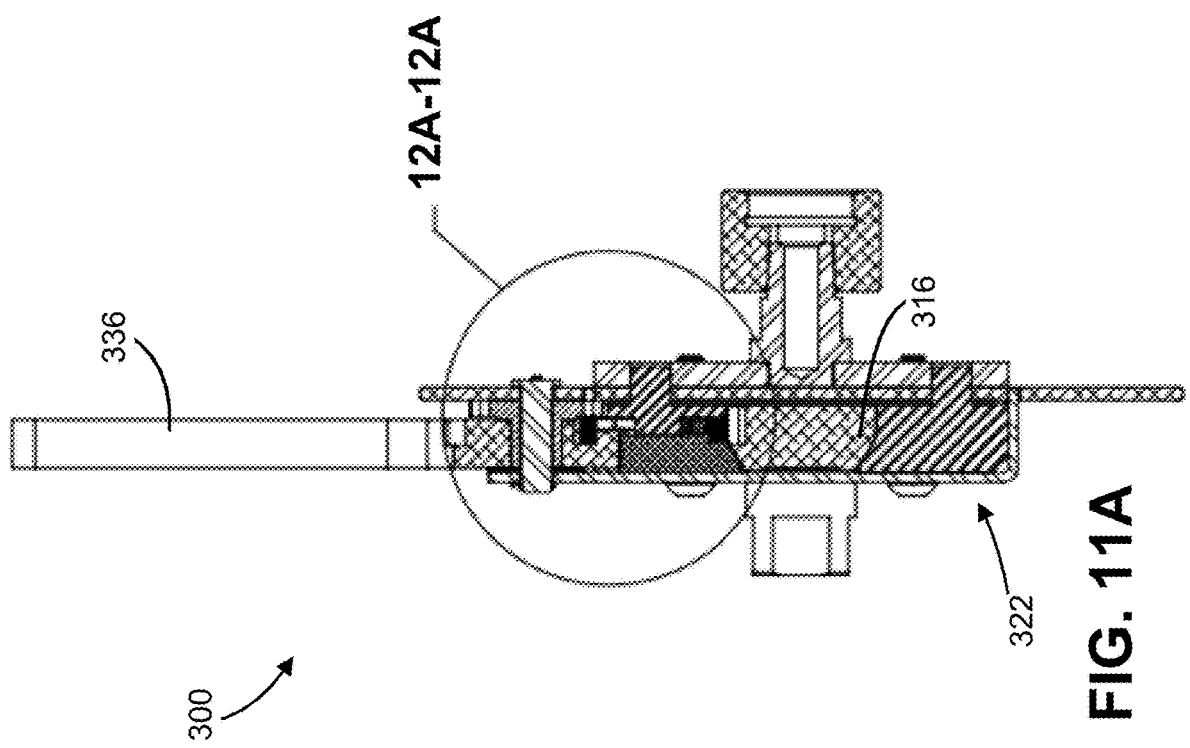
FIG. 11A is the view of FIG. 11 showing the locking lever in the open position.

Moving the locking lever 336 from the neutral position to the open position, as shown in FIGS. 11A and 12A, causes the lever pawl 344 to lift the locking pin 332 upward and away from the crank arm 316. This lifting causes the locking spring 334 to compress between the locking pin 332 and the tab 329 of the fixed upper glide block 328, generating a load in the locking spring 334 and tension in the locking lever 336. With the locking lever 336 in the open position, the crank arm 316 is free to slide along its axis 30 through the retention block 322. Releasing the locking lever 336 from its open position retracts the lever pawl 344 from the locking pin 332 and allows the locking spring 334 to push the locking pin 332 toward the upper side of the crank arm 316. This returns the locking lever 336 to its neutral position.

Moving the locking lever 336 from the neutral position to the closed position, as shown in FIGS. 11B and 12B, causes the cam 342 to rotate about the pin 338 until its maximum radius profile 342b pushes the clamping block 330 toward the angled surface of the upper side of the crank arm 316. The cam 342 thereby applies a perpendicular force to the clamping block 330, which in turn applies a stabilizing force against the crank arm 316 to ensure that the crank arm 316 remains immobile while the locking lever 336 is in its closed position.

Multiple variations to the above-described embodiment can be made without departing from the present invention. For example, in one embodiment, the bottom surface of the crank arm 116 can include a plurality of recesses (not shown) that correspond in number and position to the plurality of notches 124a-e on the upper surface of the crank arm 116. In addition, the fixed lower glide block 126 can include a retractable guide detent (not shown) that is sized and shaped to interface with one of the plurality of recesses on the bottom surface of the crank arm 116. The guide detent serves as another tactile indicator of when the crank arm 116 is positioned such that the locking pin 132 is aligned with one of the plurality of notches 124a-e of the crank arm 116. One embodiment could include a secondary spring to retain the locking lever 136 in its neutral position and prevent excess movement. Other embodiments include various ways to actuate the cam mechanism instead of the locking lever 136, such as a rotating knob. Further, pin 138 could be oriented perpendicularly from the current embodiment with associated actuating lever, rotating knob, or slider. The present embodiment incorporates both opening functions in the locking lever 136; another embodiment describes separating both functions into distinct actuating devices. Another embodiment includes regularly spaced gear-like teeth on the upper side of the crank which could interface with similarly spaced holes in the clamping block 130 to fix the crank arm 116 in place. In another embodiment, the clamping block 130 could be replaced with an alternate mechanism that clamps the crank arm 116 from behind mounting plate 118 against the fixed upper and lower guide blocks 126 and 128. Such modifications are intended to be within the scope of the present invention.

Figure 13:
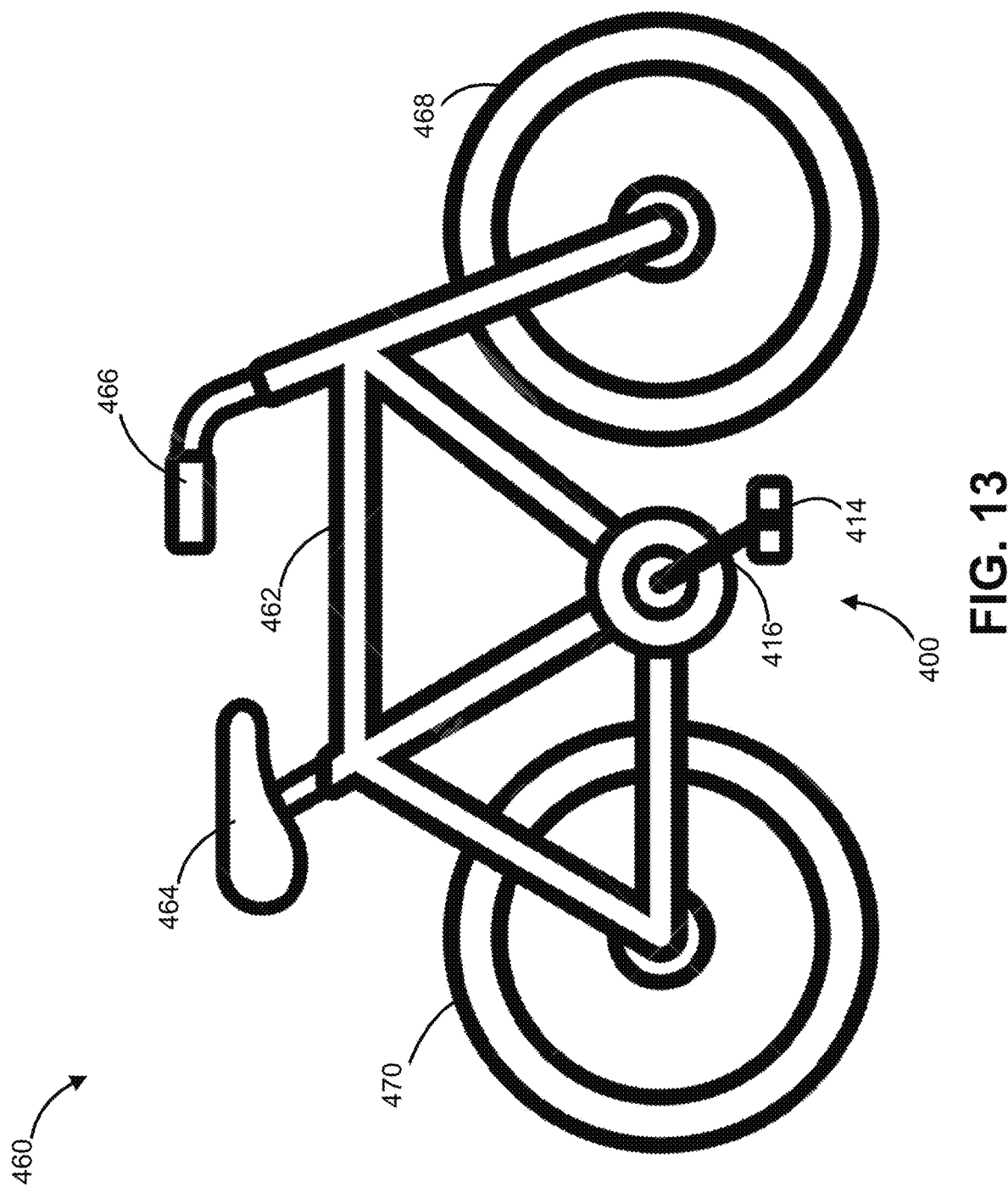
FIG. 13 is a diagram of an outdoor bicycle that includes a crank assembly constructed in accordance with an embodiment of the present invention.
Figure 14:
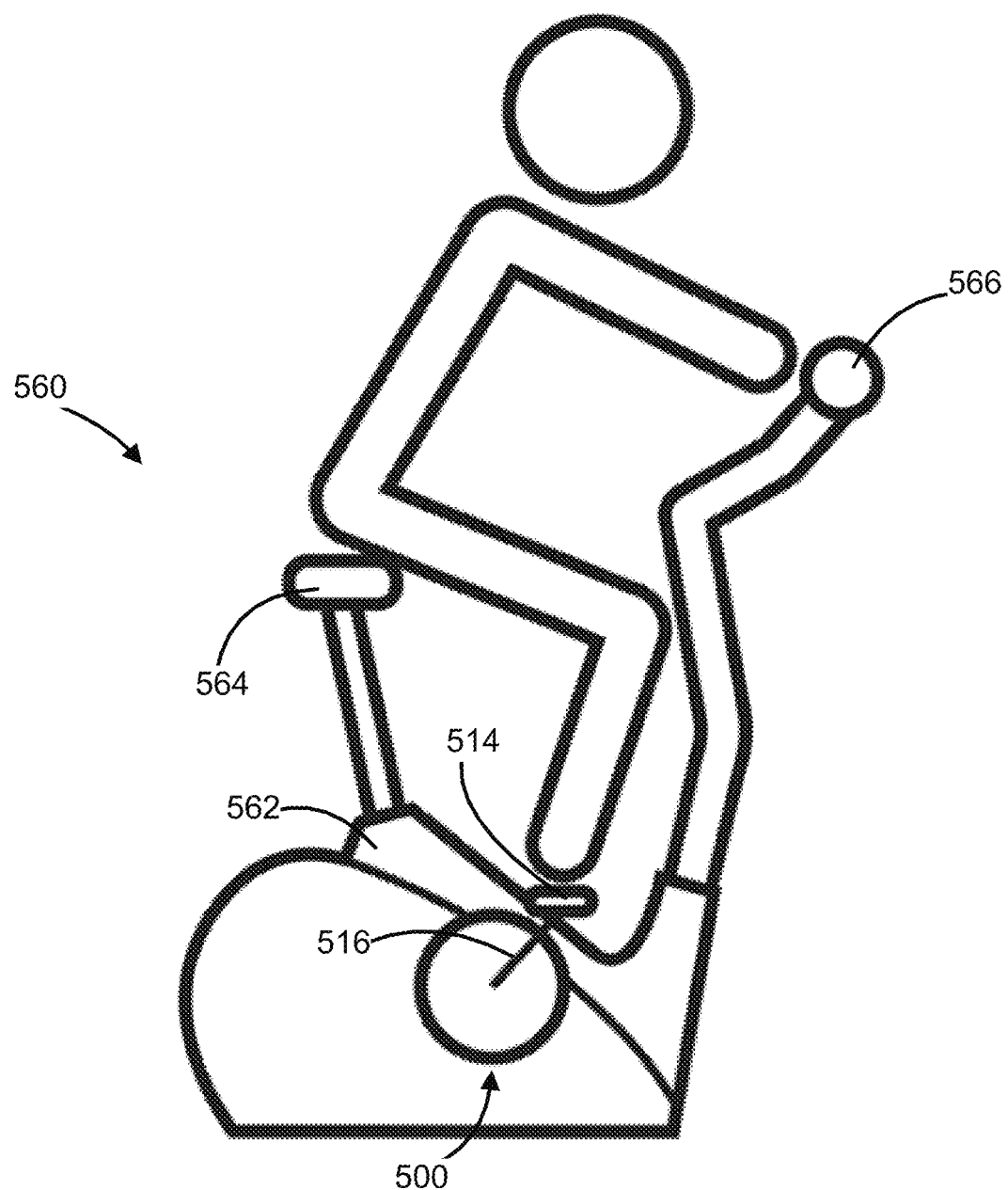
FIG. 14 is a diagram of a stationary exercise bicycle that includes a crank assembly constructed in accordance with an embodiment of the present invention.

Turning now to FIGS. 13 and 14, an outdoor bicycle 460 and a stationary exercise bicycle 560 are illustrated as potential applications for the adjustable crank assemblies discussed above. The bicycle 460 shown in FIG. 13 has a frame 462 with an attached rider's seat 464 and an attached handle 466 for supporting a rider thereon. The bicycle 460 also includes a front wheel 468 attached to the front end of the frame 462 and a rear wheel 470 attached to the rear end of the frame 462, and a crank assembly 400 is attached to the lower end of the frame 462 and operatively linked to the rear wheel 470 by a drive system, such as a set of gears linked by a chain drive. The crank assembly 400 is constructed in accordance with any of the embodiments discussed above and provides an adjustable crank arm 416 connected to pedals 414 that can be adjusted to the therapeutically effective length for the user.

The stationary exercise bicycle 560 shown in FIG. 14 has a similar arrangement to the outdoor bicycle 460 in that it includes a frame 562 with an attached seat 564 and handle 566 and an adjustable crank assembly 500. However, the exercise bicycle 560 does not include wheels that enable it to move. Instead, the frame 562 is shaped to stand on a support surface, such as a floor, and the adjustable crank assembly 500, which is constructed in accordance with any of the embodiments discussed above, is attached to a flywheel (not shown) that has an adjustable resistant member, such as an overlapping belt, for providing resistance to rotating the adjustable crank arm 516 via the pedals 514. This arrangement allows the user of the exercise bicycle 560 to increase or decrease the level of resistance the user must pedal through for strength training purposes. As with the adjustable crank assembly 400 of the bicycle 460, the adjustable crank assembly 500 of the exercise bicycle 560 provides an adjustable crank arm 516 that can be adjusted to the therapeutically effective length for the user.

While the principles of the invention have been described above in connection with preferred embodiments, it is to be clearly understood that this description is made only by way of example and not as a limitation of the scope of the invention.

The invention claimed is:

1. An adjustable crank assembly comprising:
   a crank arm having a proximal end, a distal end, a pedal rotatably attached to the distal end, a longitudinal axis, and a surface having a plurality of notches formed therein;
   a retention block at least partially housing the proximal end of the crank arm, the retention block being sized and shaped to enable the crank arm to move relative to the retention block and along the longitudinal axis;
   a securing mechanism including:
      a locking pin sized and shaped to selectively engage each of the plurality of notches, the locking pin being biased to engage with any one of the plurality of notches; and
      a clamping body sized and shaped to interface with the surface of the crank arm, the clamping body being configured to selectively apply a clamping force to the surface of the crank arm; and
   a locking mechanism adapted to selectively engage the locking pin and the clamping body and includes an unlocked position and a locked position;
   wherein the locking mechanism is operationally configured to apply a retracting force to the locking pin when the locking mechanism is in the unlocked position, thereby causing the locking pin to disengage from one of the plurality of notches; and
   wherein the locking mechanism is operationally configured to apply a compressive force to the clamping body when the locking mechanism is in the locked position, thereby causing the clamping body to apply a clamping force to the surface of the crank arm.

2. The adjustable crank assembly of claim 1, wherein the locking mechanism further includes a neutral position in which the retracting force is not applied by the locking mechanism to the locking pin and the compressive force is not applied by the locking mechanism to the clamping body.

3. The adjustable crank assembly of claim 1, wherein the clamping body has a clamping axis along which the clamping body moves when the locking mechanism transitions from an unlocked to a locked position, and the clamping body is sized and shaped such that a first component of the clamping force is parallel to the clamping axis.

4. The adjustable crank assembly of claim 3, wherein a second component of the clamping force is oblique to the clamping axis.

5. The adjustable crank assembly of claim 1, wherein the locking mechanism comprises a lever that rotates about a lever axis when the locking mechanism transitions from the unlocked position to the locked position.

6. The adjustable crank assembly of claim 5, wherein the lever includes a cam surface and the compressive force is applied to the clamping body by the cam surface when the locking mechanism is in the locked position.

7. The adjustable crank assembly of claim 5, wherein the lever includes a pawl that is adapted to apply the retractive force to the locking pin when the locking mechanism is in the unlocked position.

8. The adjustable crank assembly of claim 5, wherein the lever axis is substantially perpendicular to the longitudinal axis of the crank arm.

9. The adjustable crank assembly of claim 5, wherein the lever axis is substantially parallel to the longitudinal axis of the crank arm.

10. The adjustable crank assembly of claim 1, wherein the securing mechanism and the locking mechanism are housed at least partially within the retention block.

11. The adjustable crank assembly of claim 1, wherein the clamping body includes a channel in which at least a portion of the locking pin resides.

12. A method of operating an adjustable crank assembly comprising a crank arm having a surface with a plurality of notches; a retention block that is sized and shaped to partially house the crank arm and enable the crank arm to move relative to the retention block along an axis; and a securing mechanism including a locking pin and a clamping body; the locking pin being sized and shaped to selectively engage with each of the plurality of notches and including a resilient member biasing the locking pin toward the surface of the crank arm, and the clamping body being sized and shaped to selectively apply a clamping force to the surface of the crank arm, the method comprising:
(a) applying a retracting force to the locking pin to cause the locking pin to disengage from a first one of the plurality of notches in the surface of the crank arm;
(b) sliding the crank arm through the retention block so that the locking pin is aligned with a second one of the plurality of notches;
(c) releasing the retracting force from the locking pin, thereby allowing the locking pin to engage with the second one of the plurality of notches; and
(d) applying a compressive force to the clamping body, thereby causing the clamping body to apply a clamping force to the surface of the crank arm.

13. The method of claim 12, wherein the adjustable crank assembly further includes a locking lever configured to rotate about a pin between an unlocked position and a locked position.

14. The method of claim 13, wherein step (d) includes rotating the locking lever to the locked position, wherein the locking lever applies the compressive force to the clamping body when located in the locked position.

15. The method of claim 14, wherein the locking lever includes a cam surface that applies the compressive force to the clamping body when the locking lever is located in the locked position.

16. The method of claim 13, wherein step (a) includes rotating the locking lever to the unlocked position, wherein the locking lever applies the retracting force to the locking pin when located in the unlocked position.

17. The method of claim 16, wherein the locking lever includes a lever pawl that applies the retracting force to the locking pin when the locking lever is located in the unlocked position.

18. A bicycle comprising:
a frame including a seat and at least one riding handle; and
am adjustable crank assembly attached to the frame, the adjustable crank assembly comprising:
 a crank arm having a proximal end, a distal end, a pedal rotatably attached to the distal end, a longitudinal axis, and a surface having a plurality of notches formed therein;
 a retention block at least partially housing the proximal end of the crank arm, the retention block being sized and shaped to enable the crank arm to move relative to the retention block and along the longitudinal axis;
 a securing mechanism including:
  a locking pin sized and shaped to selectively engage each of the plurality of notches, the locking pin being biased to engage with any one of the plurality of notches; and
  a clamping body sized and shaped to interface with the surface of the crank arm, the clamping body being configured to selectively apply a clamping force to the surface of the crank arm; and
 a locking mechanism adapted to selectively engage the locking pin and the clamping body and includes an unlocked position and a locked position;
wherein the locking mechanism is operationally configured to apply a retracting force to the locking pin when the locking mechanism is in the unlocked position, thereby causing the locking pin to disengage from one of the plurality of notches; and
wherein the locking mechanism is operationally configured to apply a compressive force to the clamping body when the locking mechanism is in the locked position, thereby causing the clamping body to apply a clamping force to the surface of the crank arm.

19. The bicycle of claim 18, wherein the bicycle includes a front wheel and a back wheel attached to opposite ends of the frame.

20. The bicycle of claim 18, wherein the adjustable crank assembly is attached to a resistant member for applying resistance to rotation of the crank arm.

* * * * *